United States Patent
Delianne et al.

(10) Patent No.: US 10,601,289 B2
(45) Date of Patent: Mar. 24, 2020

(54) METHOD FOR FORGING MAGNET WHEEL FOR MOTOR VEHICLE ALTERNATOR USING COLD FORGING DIE, AND MAGNET WHEEL OBTAINED BY THIS METHOD

(71) Applicant: VALEO EQUIPEMENTS ELECTRIQUES MOTEUR, Creteil (FR)

(72) Inventors: Henri Delianne, Maresville (FR); Michel Bocquel, Cabourg (FR); Herve Ribot, Peronne (FR)

(73) Assignee: Valeo Equipements Electriques Moteur, Creteil (FR)

( * ) Notice: Subject to any disclaimer, the term of this patent is extended or adjusted under 35 U.S.C. 154(b) by 627 days.

(21) Appl. No.: 15/123,747

(22) PCT Filed: Mar. 2, 2015

(86) PCT No.: PCT/FR2015/050498
§ 371 (c)(1),
(2) Date: Sep. 6, 2016

(87) PCT Pub. No.: WO2015/136185
PCT Pub. Date: Sep. 17, 2015

(65) Prior Publication Data
US 2017/0019002 A1    Jan. 19, 2017

(30) Foreign Application Priority Data
Mar. 5, 2014   (FR) ..................................... 14 51776

(51) Int. Cl.
*B21K 1/28* (2006.01)
*H02K 15/02* (2006.01)
(Continued)

(52) U.S. Cl.
CPC ............. *H02K 15/022* (2013.01); *B21K 1/28* (2013.01); *B21K 1/30* (2013.01); *H02K 1/243* (2013.01)

(58) Field of Classification Search
CPC ........... H02K 15/022; B21K 1/28; B21K 1/30
(Continued)

(56) References Cited

U.S. PATENT DOCUMENTS 7,676,902 B2 *   3/2010   Kawai ...................... B21K 1/30
                                                           29/598
2002/0138968 A1   10/2002   Kato et al.
2005/0188738 A1 *  9/2005   Rauscher ............. H02K 21/044

FOREIGN PATENT DOCUMENTS

JP   2010252560        11/2010
JP   2010252560 A  *  11/2010   ............... B21K 1/28
(Continued)

OTHER PUBLICATIONS

Taylan Altan; Gracious Ngaile; Gangshu Shen, Cold and Hot Forging: Fundamentals and Applications, Feb. 2004, Chapter 14 (Year: 2004).*

*Primary Examiner* — Debra M Sullivan
(74) *Attorney, Agent, or Firm* — Berenato & White, LLC

(57) ABSTRACT

The method according to the invention involves a hot-forging step and a cold-forging step that occurs after the hot-forging step. A polar wheel (10, 11) incorporating a plurality of finite chamfers (102) formed on exterior parts of the polar teeth (10g, 11g) is produced during the hot-forging step. According to the invention, the cold-forging step involves substeps of placing the polar wheel in a die, cold die-stamping the polar wheel with a first and a second blow in the axial direction of the polar wheel, upsetting material onto interior parts of the polar teeth (10g, 11g) so as to form magnet-housing grooves (100) and magnet lips (101).

9 Claims, 3 Drawing Sheets

(51) Int. Cl.
*H02K 1/24* (2006.01)
*B21K 1/30* (2006.01)

(58) Field of Classification Search
USPC .................................................. 72/352–360
See application file for complete search history.

(56) References Cited

FOREIGN PATENT DOCUMENTS

| KR | 101396284 | | 5/2014 | |
|---|---|---|---|---|
| KR | 101396284 | B1 * | 5/2014 | ............... B21K 1/28 |

* cited by examiner

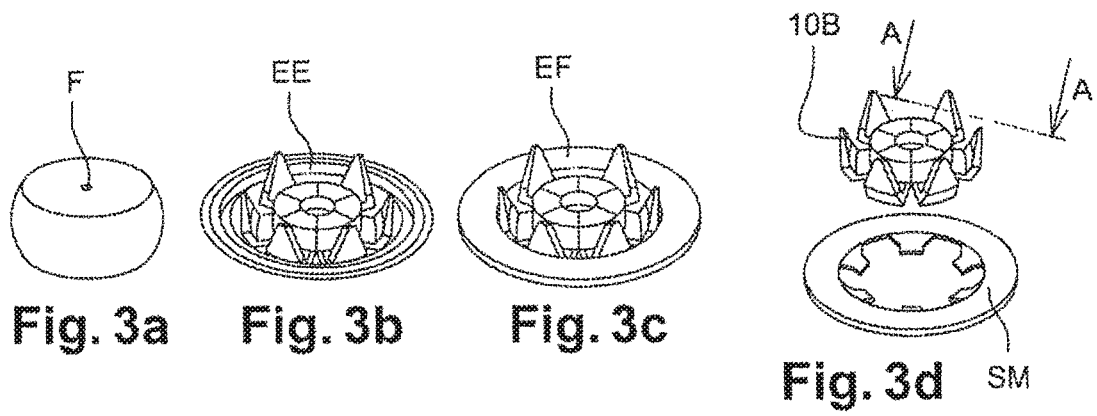
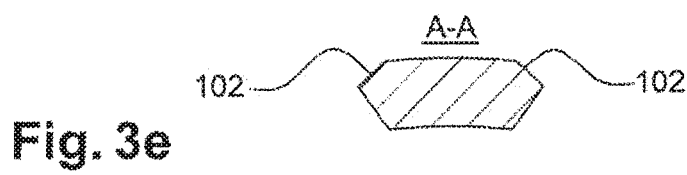
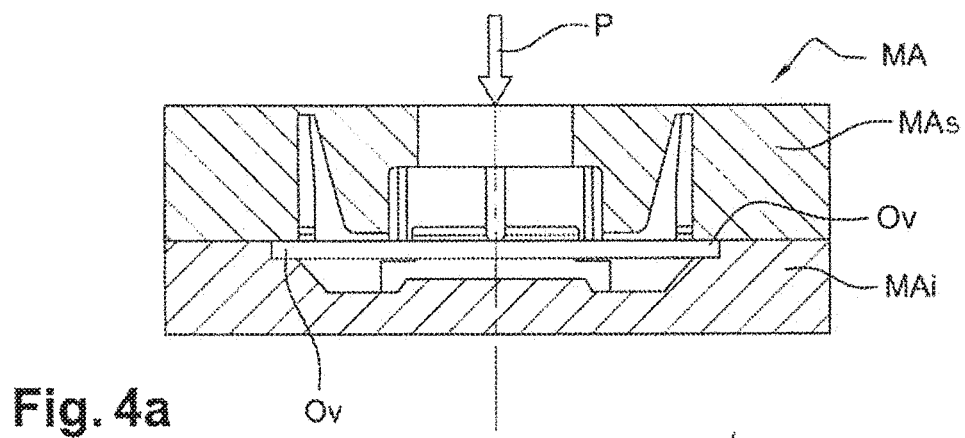
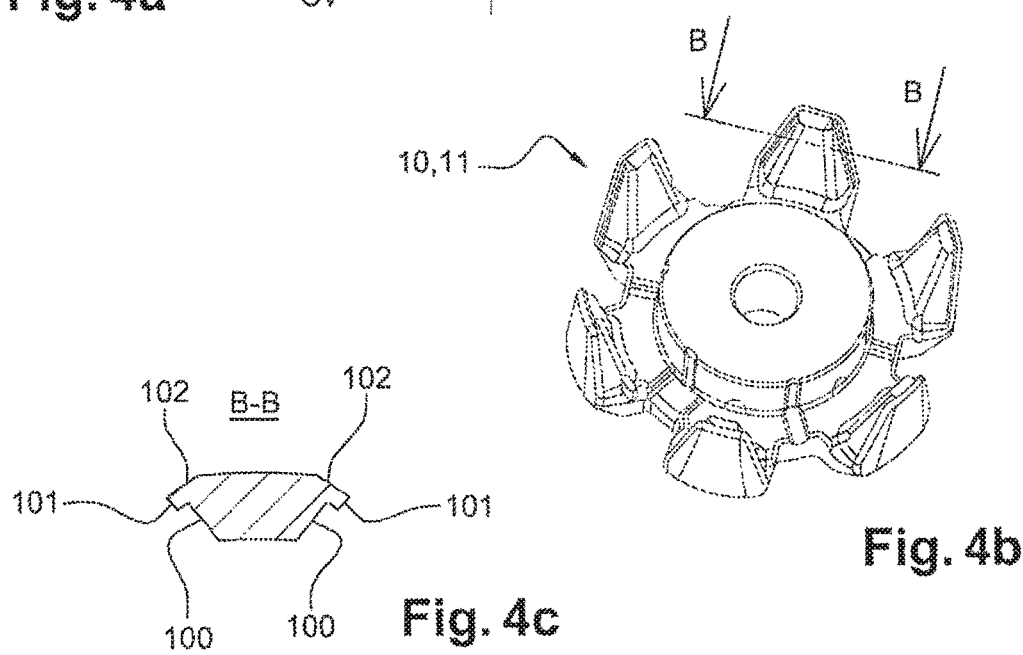

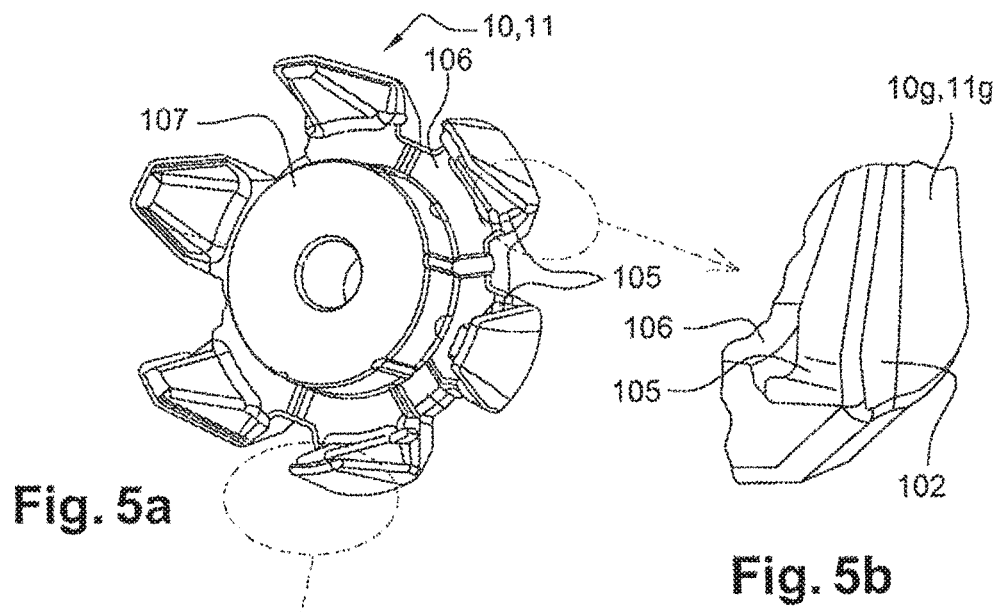
Fig. 5a
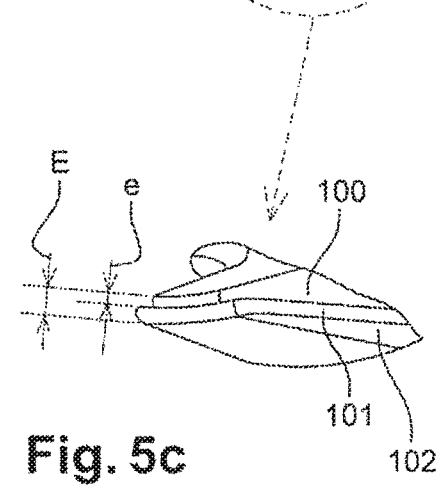
Fig. 5c
Fig. 5b
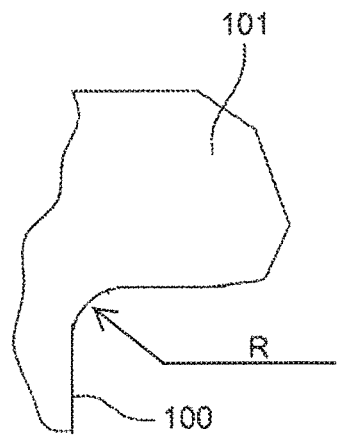
Fig. 5d

METHOD FOR FORGING MAGNET WHEEL FOR MOTOR VEHICLE ALTERNATOR USING COLD FORGING DIE, AND MAGNET WHEEL OBTAINED BY THIS METHOD

CROSS-REFERENCE TO RELATED APPLICATIONS AND CLAIM TO PRIORITY

This application is a national stage application of International Application No. PCT/FR2015/050498 filed Mar. 2, 2015, which claims priority to French Patent Application No. 1451776 filed Mar. 5, 2014, the disclosures of which are incorporated herein by reference and to which priority is claimed.

FIELD OF THE INVENTION

In general, the invention relates to a method for forging magnet wheels which are designed for the rotor of a rotary electrical machine of the Lundell type, such as an alternator or an alternator-starter of a motor vehicle. More particularly, the invention relates to the production of magnet wheels for a rotor which is equipped with permanent interpolar magnets.

The invention also relates to a cold forging die, and a magnet wheel obtained by means of implementation of the forging method according to the invention.

BACKGROUND OF THE INVENTION

Conventionally, the production of magnet wheels for alternators with claws uses forging operations.

Rotors which are equipped with permanent interpolar magnets require the production of grooves for accommodation of the magnets, and of magnet lips in the teeth of the magnet wheels. The magnet lips ensure the retention in place of the permanent magnets, which are subjected to the effects of the centrifugal force when the rotor is rotating.

It is known to produce the grooves of magnet receptacles and the magnet lips by means of a machining operation which takes place after the forged magnet wheel has been obtained. In the industrial process of production of the magnet wheels, this machining operation has the disadvantage of increasing the duration of production and the cost of the part.

U.S. Pat. No. 7,676,902 B2 describes a method for production of a magnet wheel in which the operation of machining of the grooves for accommodation of the magnet is eliminated. The magnet wheel is obtained by using only forging operations. The grooves for accommodation of the magnet and the magnet lips are preformed by hot forging. Cold forming tools are then used to complete the production of the grooves and lips, as well as of the chamfers provided in the teeth of the magnet wheel. These cold forming tools are actuated radially, i.e. according to the radius of the magnet wheel.

It is desirable to provide other solutions for the forging of the grooves for accommodation of the magnet and of the magnet lips, in order to be able to comply with the various constraints which apply in the industrial processes for production of magnet wheels.

SUMMARY OF THE INVENTION

According to a first aspect, the objective of the present invention is to provide a method for forging a magnet wheel incorporating a plurality of polar teeth which are designed for the rotor of a rotary electrical machine of the Lundell type, the method comprising a hot forging step and a cold forging step which intervenes after the hot forging step. A basic magnet wheel is obtained on completion of the hot forging step, and incorporates a plurality of finite chamfers which are formed on the outer parts of the polar teeth.

According to the invention, the cold forging step comprises the following sub-steps:

a) putting the basic magnet wheel into place in a die;

b) application by means of cold die stamping of a first blow on the basic magnet wheel, in the axial direction of the latter, giving rise to a first upsetting of material onto inner parts of the polar teeth, in order to pre-forge a formation of magnet receptacle grooves and magnet lips; and c) application by means of cold die stamping of a second blow on the basic magnet wheel, in the axial direction of the latter, giving rise to a second upsetting of material onto the inner parts of the polar teeth, in order to finish the formation of the magnet receptacle grooves and magnet lips.

According to another characteristic, the method according to the invention also comprises a step of cutting surplus material from the contours of the magnet wheel, this cutting step intervening after the cold forging step.

According to yet another characteristic, in the sub-step a), the basic magnet wheel is placed in a corresponding mould of a lower die of the said die, with the polar teeth oriented upwards.

According to yet another characteristic, in the sub-steps b) and c), the definitive form of the polar teeth, with the magnet receptacle grooves and the magnet lips, is provided by a corresponding mould of an upper die of the said die.

According to yet another characteristic, in the sub-steps b) and c), a vertical thrust is exerted on the die, with a pressure of between 150 and 1500 tonnes for each of the blows.

According to another aspect, the invention also relates to a cold forging die for implementation of the method according to the invention briefly described above. According to the invention, the cold forging die comprises a lower die and an upper die, and an opening at a joining plane between the lower and upper dies, the opening being provided for flash from the magnet wheel, and having a dimension of between 0.1 mm and 6 mm.

According to yet another aspect, the invention also relates to a magnet wheel obtained by implementation of the method according to the invention described briefly above.

BRIEF DESCRIPTION OF THE DRAWINGS

Other characteristics and advantages of the invention will become apparent from reading the following description of an embodiment of it, illustrated by:

FIGS. 3a to 3d which show the progressive formation of a basic magnet wheel in a hot forging step of the method according to the invention;

FIG. 3e which shows a section of tooth of the basic magnet wheel in FIG. 3d, obtained on completion of the hot forging step;

FIGS. 4a to 4c which concern a cold forging step of the method according to the invention:

FIG. 4a being a view in cross-section of a die used in the cold forging step of the method according to the invention;

FIG. 4b being a view in perspective of the magnet wheel according to the invention obtained upon completion of the cold forging step;

FIG. 4c showing a section of tooth of the magnet wheel in FIG. 4b; and

FIGS. 5a to 5d which show the magnet wheel according to the invention as well as details of its embodiment:

FIG. 5a being an enlarged representation of the magnet wheel according to the invention;

FIG. 5b being a partial view in perspective showing a reservoir provided at the base of the polar teeth of the magnet wheel according to the invention;

FIG. 5c being a partial view in perspective showing a configuration at the end of the tooth of the magnet receptacle grooves and of the magnet lip; and FIG. 5d being a schematic view in cross-section showing an inner radius provided in the magnet receptacle groove, at the base of the magnet lip.

DETAILED DESCRIPTION OF THE PREFERRED EMBODIMENT(S)

Figure 1:
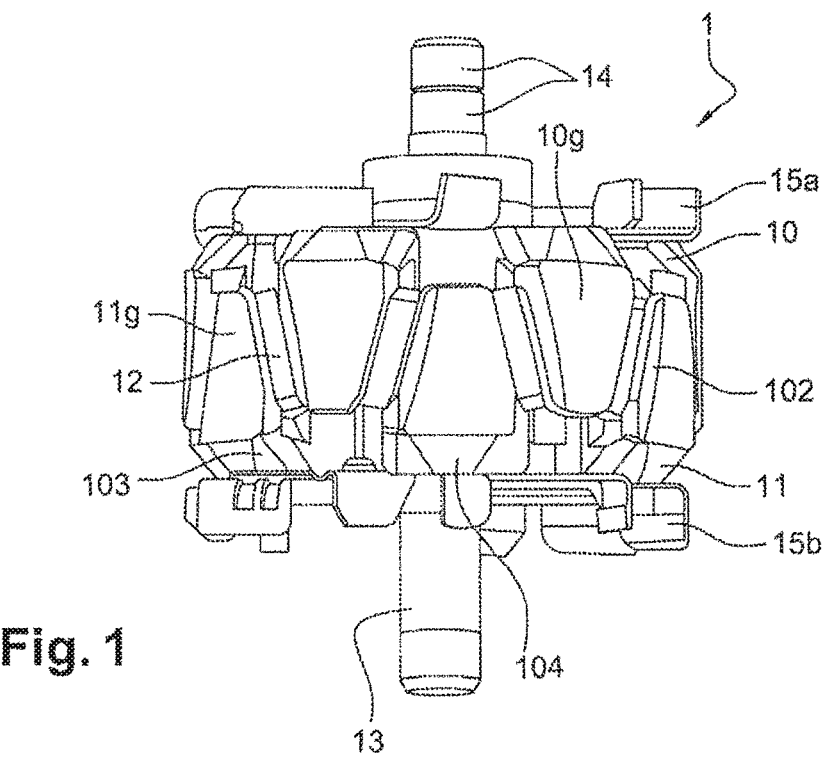
FIG. 1 which is a view showing a rotor with claws of a motor vehicle alternator.

With reference to FIG. 1, the rotor 1 of a rotary electrical machine of the Lundell type, also known as a claw machine, substantially comprises two magnet wheels 10 and 11, permanent interpolar magnets 12, an excitation coil (not shown), a shaft 13, a collector 14, and two fans 15a, 15b which are used for cooling of the machine.

The magnet wheels 10, 11 are fitted on the shaft 13 such that their respective teeth 10g, 11g are imbricated, and form an alternation of South (S) and North (N) magnetic poles. These S and N magnetic poles are produced by the supply of electric current to the excitation coil which is inserted in a central core between the magnet wheels 10 and 11. The excitation coil is supplied by means of the collector 14.

The interpolar magnets 12 are accommodated in the spaces which exist between the S and N teeth of the magnet wheels 10, 11. In the particular embodiment of the rotor 1 represented in FIG. 1, all of the inter-tooth spaces are occupied by the magnets 12. In other embodiments, the magnets 12 occupy only part of the inter-tooth spaces available.

Figure 2:
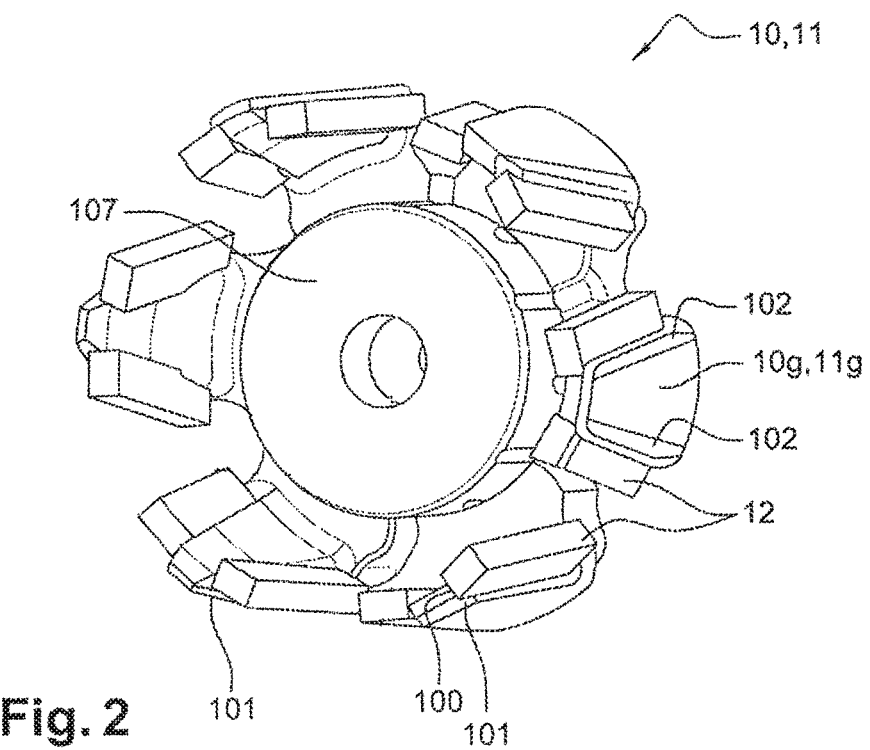
FIG. 2 which is a view in perspective of a magnet wheel equipped with permanent magnets, included in the rotor in FIG. 1.

In FIG. 2, the magnet wheel 10, 11 is shown with the permanent magnets 12. Magnet receptacle grooves 100 and lips 101 are provided in the teeth 10g, 11g of the magnet wheel, in order to allow the magnets 12 to be fitted in the inter-tooth spaces, and to keep them in position when the rotor 1 rotates, and the centrifugal force effects are being exerted.

Magnetic 102, aeraulic 103 and balancing 104 chamfers are also provided in each of the teeth 10g, 11g. The magnetic chamfers 102 are provided on both sides of the longitudinal edges of the tooth 10g, 11g as shown in FIG. 2. The aeraulic 103 and balancing 104 chamfers can be seen in FIG. 1.

With reference more particularly to FIGS. 3a to 3e and 4a to 4c, a description is now provided of the forging method according to the invention.

The forging method according to the invention comprises two main steps, i.e. a hot forging step followed by a cold forging step.

The hot forging step makes it possible to obtain from a previously flattened iron slug F (FIG. 3a) a basic magnet wheel 10B (FIG. 3d) in which the chamfers 102, 103 and 104 have been formed. No pre-form of the groove or of the magnet lip is provided during this hot forging step.

In a conventional manner, the hot forging step comprises an operation of producing a blank EE (FIG. 3b), a finishing operation EF (FIG. 3c), and an operation of cutting out surplus material SM (FIG. 3d) from the contours of the basic magnet wheel 10B.

On completion of the hot forging step, each of the teeth 10g, 11g is formed with the chamfers 102, 103 and 104. A cross-section of the tooth 10g, 11g according to a cross-sectional axis A-A (FIG. 3d) is shown in FIG. 3e.

The cold forging step serves the purpose of providing the grooves for accommodation of the magnet 100 and lips 101 for the magnets 12. For this purpose, grooves are provided below the teeth 10g, 11g at the longitudinal edges of the latter. These grooves are provided by upsetting of the material, by means of two successive operations of cold blow application using a cold forging die MA shown in FIG. 4a.

As shown in FIG. 4a, the cold forging die MA is formed by a lower die MAi and an upper die MAs.

The basic magnet wheel 10B is placed in a corresponding mould of the lower die MAi, with the teeth oriented upwards.

The upper die MAs comprises the definitive form of the tooth 10g, 11g, with the grooves for accommodation of the magnet 100 and the lips 101.

An opening Ov at the joining plane between the lower MAi and upper MAs dies is provided for the flash, and has a dimension of 0.1 mm to 0.6 mm depending on the applications.

A vertical thrust P is exerted on the die MA, until contact takes place at the joining plane between the upper die MAs and the lower die MAi. The material is thrust into the pre-form provided for this purpose in the die. A blocking counter support is provided on the iron diameter of the part and/or the magnetic 102, aeraulic 103 and balancing 104 chamfers. Depending on the applications, the chamfers 102, 103 and 104 are formed and/or maintained.

The cold die stamping operation is carried out with two successive blows, with pressures which are the same or different, depending on the applications, typically between 150 and 1500 tonnes.

An operation of cutting off the surplus material at the contours of the magnet wheel 10, 11 is carried out after the cold die stamping operation. The production of the magnet wheel 10, 11 is then completed, with the latter comprising the magnet receptacle grooves 100 and lips 101, as well as the chamfers 102, 103 and 104 previously obtained in the hot forging step. A cross-section of the tooth 10g, 11g according to a cross-sectional axis BB (FIG. 4b) is shown in FIG. 4c.

Details of production of the magnet wheel 10, 11 are now described with reference to FIGS. 5a to 5d.

As shown in FIGS. 5a and 5b, reservoirs 105 are provided at the base of each of the teeth 10g, 11g of the magnet wheel 10, 11. There are two of these reservoirs 105 for each tooth 10g, 11g, situated on both sides of the latter. It will be noted in FIG. 5b that the reservoirs 105 are provided under a substantially annular inner surface 106 of the magnet wheel 10, 11. The surface 106 is contained between the base of the teeth 10g, 11g and the central core 107 of the magnet wheel 10, 11.

These reservoirs 105 which are located at the base of the teeth 10g, 11g are necessary in the magnet wheel according to the invention since they allow the wheel to be produced by means of implementation of the forging method according to the invention, as it has just been described above. In fact, the reservoirs 105 provide a space for the material which is upset during the two successive blows of the cold forging step, and thus make possible complete production of the part by forging, with cold forging in the axial direction.

Tests have been carried out by the inventive body, and have shown the advantage of two particular characteristics described below of the magnet wheel 10, 11 according to the invention, in particular for the mechanical resistance of the lips 101 to the centrifuging.

A radius R at the base of the lip 101, shown in FIG. 5*d*, must be between R=0.3 mm and R=10 mm, depending on the applications.

Along the entire length of the tooth 10*g*, 11*g*, from its base to its tip shown in FIG. 5*c*, a ratio e/E between the thickness E of the tooth 10*g*, 11*g* and the thickness e of the lip 101 must be between e/R=0.5 and e/R=1.

The invention claimed is:

1. A method for forging a magnet wheel (10, 11) of a rotor (1) of a rotary electrical machine of the Lundell type, the magnet wheel (10, 11) including a plurality of polar teeth (10*g*, 11*g*), the method comprising a hot forging step and a cold forging step executed after the hot forging step, a basic magnet wheel (10B) including a plurality of finite chamfers (102, 103, 104) formed on an outer part of each of the polar teeth being provided during the hot forging step, wherein the cold forging step comprises the following sub-steps:
   a) putting the basic magnet wheel (10B) into place in a cold forging die (MA);
   b) application by cold die stamping of a first blow on the basic magnet wheel (10B) in the axial direction of the magnet wheel, giving rise to a first upsetting of material onto inner parts of the polar teeth (10*g*, 11*g*) in order to pre-forge a formation of magnet receptacle grooves (100) and magnet lips (101); and
   c) application by cold die stamping of a second blow on the basic magnet wheel (10B) in the axial direction of the magnet wheel disposed in the cold forging die (MA), giving rise to a second upsetting of material onto the inner parts of the polar teeth (10*g*, 11*g*) in order to finish the formation of the magnet receptacle grooves (100) and the magnet lips (101).

2. The method according to claim 1, further comprising a step of cutting surplus material from contours of the magnet wheel, the cutting step executed after the cold forging step.

3. The method according to claim 2, wherein in the sub-step a), the basic magnet wheel (10B) is placed in a corresponding mold of a lower die (MAi) of the cold forging die (MA), with the polar teeth (10*g*, 11*g*) oriented upwards.

4. The method according to claim 2, wherein, in the sub-steps b) and c), a vertical thrust (P) is exerted on the cold forging die, with a pressure of between 150 and 1500 tonnes for each of the blows.

5. The method according to claim 1, wherein in the sub-step a), the basic magnet wheel (10B) is placed in a corresponding mould of a lower die (MAi) of the cold forging die (MA) with the polar teeth (10*g*, 11*g*) oriented upwards.

6. The method according to claim 5, wherein, in the sub-steps b) and c), the definitive form of the polar teeth (10*g*, 11*g*), with the magnet receptacle grooves (100) and the magnet lips (101), is provided by a corresponding mold of an upper die (MAs) of the cold forging die (MA).

7. The method according to claim 6, wherein, in the sub-steps b) and c), a vertical thrust (P) is exerted on the cold forging die, with a pressure of between 150 and 1500 tonnes for each of the blows.

8. The method according to claim 5, wherein, in the sub-steps b) and c), a vertical thrust (P) is exerted on the cold forging die, with a pressure of between 150 and 1500 tonnes for each of the blows.

9. The method according to claim 1, wherein, in the sub-steps b) and c), a vertical thrust (P) is exerted on the cold forging die, with a pressure of between 150 and 1500 tonnes for each of the blows.

* * * * *